United States Patent Office 3,046,934
Patented July 31, 1962

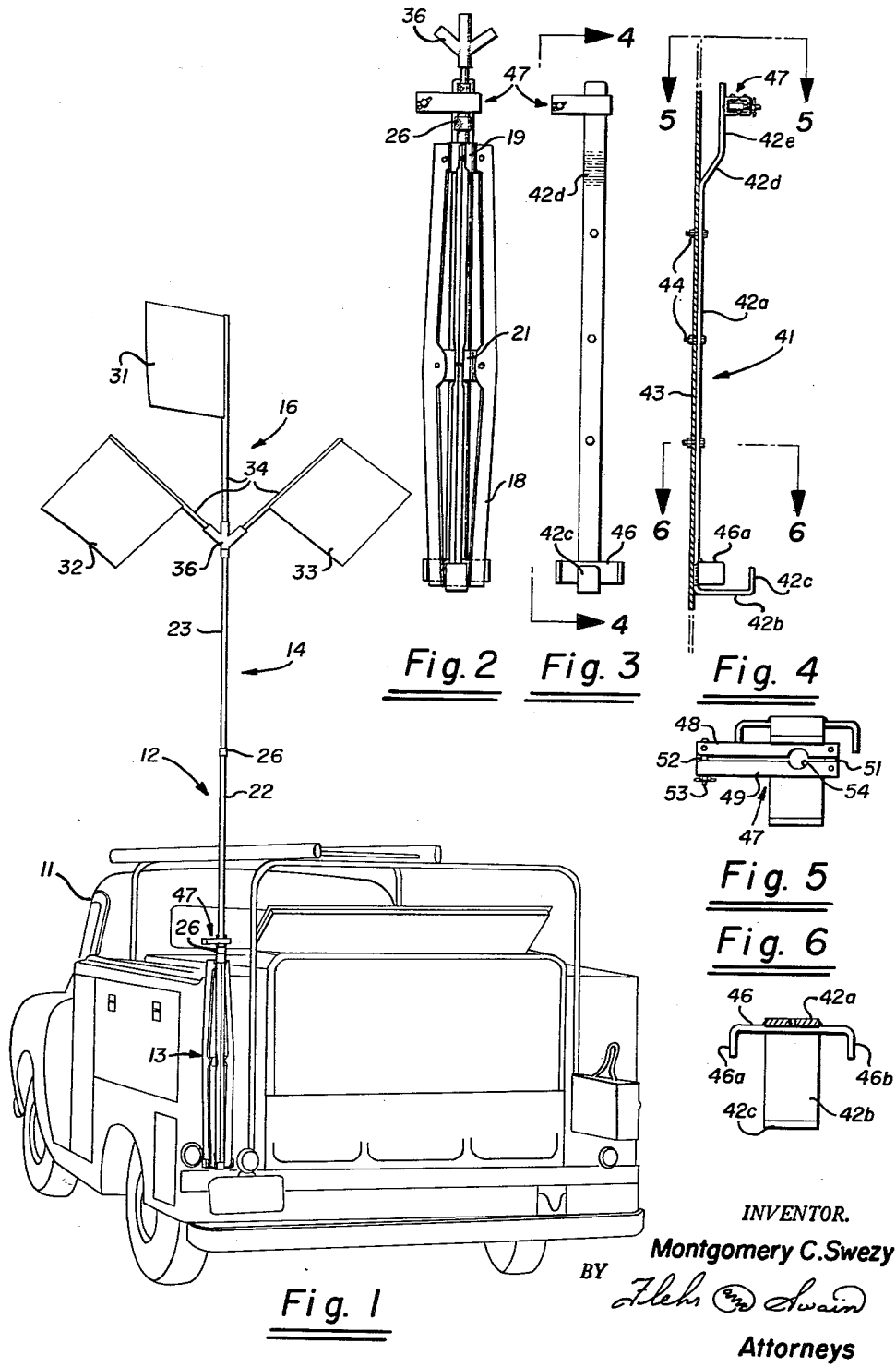

3,046,934
VEHICLE MOUNTED TRAFFIC WARNING DEVICE AND MOUNTING BRACKET THEREFOR
Montgomery C. Swezy, Palo Alto, Calif., assignor to Western Progress, Inc., Palo Alto, Calif., a corporation of Nevada
Filed Apr. 12, 1961, Ser. No. 102,609
3 Claims. (Cl. 116—173)

This invention relates to a vehicle mounted traffic warning device and mounting bracket therefor and more particularly to a traffic warning device of the type which can be readily installed on telephone service trucks, power company trucks, and other utility type vehicles.

In view of the large amount of on-street work which must be done by telephone companies, power companies, construction companies and the like utilizing vehicles which are often stopped in the streets, there is a great need to provide such vehicles with traffic warning devices which are mounted on the vehicles and which are readily visible to the oncoming traffic in both directions. Suitable traffic warning devices for mounting on vehicles have heretofore not been available.

In general, it is an object of the present invention to provide a traffic warning device which can be readily mounted on a vehicle to warn oncoming traffic.

Another object of the invention is to provide a traffic warning device in which the warning flags can be readily raised to the required elevation.

Another object of the invention is to provide a vehicle mounted traffic warning device of the above character in which the warning device can be readily mounted on and removed from the vehicle.

Another object of the invention is to provide a vehicle mounted traffic warning device of the above character in which the warning device can be removed from the vehicle and which can be made self-supporting when placed on the ground.

Another object of the invention is to provide a vehicle mounted traffic warning device of the above character in which the warning means utilized can be readily removed to permit movement of the vehicle at high speed.

Another object of the invention is to provide a vehicle mounted traffic warning device of the above character in which a special bracket is provided for mounting the warning device on the vehicle.

Another object of the invention is to provide a vehicle mounted traffic warning device of the above character in which the bracket requires very little space.

Another object of the invention is to provide a vehicle mounted warning device of the above character in which the warning device can be readily inserted and removed from the bracket.

Additional objects and features of the invention will appear from the following description in which the preferred embodiment is set forth in detail in conjunction with the accompanying drawings.

Referring to the drawings:

FIGURE 1 is a perspective view of a conventional telephone line truck with a mounting bracket and a traffic warning device inserted in the mounting bracket with the warning device in a raised position.

FIGURE 2 is a front elevational view of the warning device mounted in the mounting bracket and in a lowered position.

FIGURE 3 is a front elevational view of the mounting bracket with the warning device removed.

FIGURE 4 is a side elevational view looking along the line 4—4 of FIGURE 3.

FIGURE 5 is a cross-sectional view taken along the line 5—5 of FIGURE 4 and particularly shows the clamp which forms a part of the mounting bracket.

FIGURE 6 is a cross-sectional view taken along the line 6—6 of FIGURE 4 and particularly shows the lower portion of the bracket for receiving the collapsible tripod assembly of the traffic warning device.

In general, my vehicle mounted traffic warning device consists of a combination of the vehicle and the traffic warning device. The traffic warning device consists of a plurality of telescoping sections and means for locking the telescoping sections in various extended or retracted positions. At least one traffic attention seeking device is mounted on the uppermost section. A bracket is mounted on the vehicle and means is provided for mounting the telescoping sections in the bracket to permit the telescoping sections to be extended or retracted while they are in the bracket.

More in particular, my vehicle mounted traffic warning device, as shown in the drawings, consists of a vehicle 11 which may be of any conventional type such as the telephone truck shown in the drawing. As will be obvious from the description of the traffic warning device which follows, the vehicle can be of any type which travels on the highways or streets and which may stop or move slowly on the highways or the streets so that it is necessary or desirable to attract the attention of the oncoming traffic.

A warning device 12 is mounted on the vehicle in a suitable location as hereinafter described. The warning device 12 consists of a three-legged tripod 13, a telescoping assembly 14 mounted on the tripod, and a traffic attention attracting device 16 mounted on the telescoping assembly.

The tripod 13, as described in Patent No. 2,781,017, consists of three angle legs 18 having their upper ends pivotally mounted on a collar 19. The telescoping assembly 14 consists of three sections, a lower section 21, an intermediate section 22 and a top section 23, and in which the intermediate section telescopes into the lower section and the top section telescopes into the intermediate section. The collar 19 of the tripod is slidably mounted on the lower section 21. Means is provided for locking or retaining the telescoping sections in predetermined extended or retracted positions and consists of ferrules 26 as explained in Patent No. 2,781,017.

The traffic attention attracting device can take any suitable form such as the three flags 31, 32 and 33. Each flag is provided with a staff 34 which is removably mounted in a yoke 36 secured to the upper end of the upper or top section 23. The staff 34 for the flag 31 extends in a substantially vertical direction and the staffs 34 for the flags 32 and 33 are inclined on opposite sides of the staff 34 for the flag 31 by an angle of approximately 45°.

A particular type of bracket 41 is provided for mounting the warning device on the vehicle. It is particularly shown in FIGURES 3, 4, 5 and 6. The bracket 41, as shown, is formed from suitable material such as a thin elongate strap 42. It has a relatively long straight portion 42a which is adapted to be secured to the body 43 of the vehicle by suitable means such as bolts 44. The lower end of the strap 42 is provided with means for receiving the lower end of the tripod 13 of the traffic warning device. As shown, the bracket is constructed so that the strap 42 has a portion 42b which extends outwardly from the body at right angles to the portion 42a. It is also provided with an additional portion 42c which extends upwardly and lies in a plane substantially parallel to the plane of the portion 42a to in effect provide a U-shaped cup member. A U-shaped member 46 is secured to the lower extremity of the portion 42a by suitable means such as welding. The U-shaped member is provided with ears 46a and 46b which extend outwardly from the vehicle and from the portion 42a to receive the legs of the tripod 13 as hereinafter described.

The upper portion of the bracket 41 is provided with means for engaging an intermediate portion of the tripod to thereby support the tripod within the bracket. As shown particularly in FIGURE 4, this is accomplished by providing the strap 42 with a portion 42d which inclines outwardly and upwardly from the body and another offset portion 42e which extends in a plane parallel to the portion 42a. A suitable clamp 47 is mounted on the portion 42e. The clamp 47 consists of two main clamping members 48 and 49 which are pivotally connected together by a link 51. The other ends of the clamping members 48 and 49 are adapted to be releasably secured together by a bolt 52 which has one end pivotally connected to the member 48 and the other end which is adapted to extend through the member 49 and held in engagement with the member 49 by a butterfly nut 53. The member 48 is secured to the portion 42e. Both of the members 48 and 49 are provided with circular recesses 54 which are adapted to receive one of the tubular members of the telescoping assembly 14 as hereinafter described.

In mounting my warning device 12 within the bracket after the bracket 41 has been secured to the vehicle body in a suitable position, the tripod is first collapsed into the position shown in FIGURES 1 and 2. Thereafter, the lower end of the tripod is placed in the lower end of the bracket 41 so that two of the legs 18 of the tripod are seated between the ears 46a and 46b. The third leg is seated upon the portion 42b and behind the upstanding portion 42c as shown particularly in FIGURE 2. The clamp 47 is then swung to an open position. The upper end of the telescoping assembly, while it is in a collapsed position as shown in FIGURE 2, is moved into the clamp so that the intermediate portion 22 can be seated within the semi-circular recesses provided in the clamping members 48 and 49 and locked into position by the butterfly nut 53. In accomplishing this, it may be necessary to slightly loosen the lowermost ferrule 26 so that the intermediate section can be raised a slight amount so that there will be a sufficient portion of the intermediate section exposed to permit the clamp 47 to engage the same.

The yoke 36 can be placed on the upper section or it can be placed in the vehicle with the flags which are to be utilized with the warning device.

Now let it be assumed that the vehicle has traveled to the desired location and that it is desired to stop the vehicle in a street or on a highway in a position in which it is desirable to warn oncoming traffic. When such is the case, the driver of the vehicle steps out of the vehicle and removes the flags from the vehicle and places the staffs of the flags in the yoke 36. Thereafter, the telescoping assembly 14 is raised in a conventional manner to raise the flags to a suitable elevation so that adequate warning will be given to oncoming traffic from both directions. In raising the sections of the telescoping assembly, it will be necessary to slightly loosen the clamp 47 so that the intermediate section can be extended to its full length.

After the work has been completed, the warning device can be readily lowered into the position shown in FIGURE 2 by slightly releasing the clamp and the ferrules and then removing the flags and placing them in the vehicle. Thereafter, the vehicle can proceed to the next location. If the vehicle is only travelling a short distance or if it is travelling quite slowly, it is possible to leave the warning device in its uppermost position as shown in FIGURE 1.

It will be noted that the bracket 41 is constructed in such a manner that no part of the warning device can come in contact with the body of the vehicle. This is important in that it prevents rattling and undue noise and at the same time prevents scratching or minor marring of the finish on the vehicle. It also will be noted that the upper end of the bracket is constructed in such a manner that the various telescoping sections are spaced from the body. This makes it possible to readily grasp the telescoping sections for raising and lowering the same.

Although I have described my vehicle mounted warning device in conjunction with a conventional telephone company splicing truck, it is readily apparent that the vehicle mounted warning device has many other applications on other types of vehicles. When it is not desired to utilize the warning device on the vehicle, the warning device can be readily removed by loosening the clamp 47 and thereafter lifting it from the bracket 41. The warning device can then be used in the conventional manner by spreading the legs and making it self-supporting so that it can serve as a suitable warning device.

It is apparent from the foregoing that I have provided a new and improved vehicle mounted warning device which is particularly adapted for use by telephone crews, power company crews, construction company crews, and the like for giving adequate warning to oncoming motorists on highways and in the streets. The particular bracket utilized makes it possible to utilize a self-supporting warning device which is suitable for mounting in the street and which also can be mounted on the vehicle without modification. The bracket also serves as means for readily storing the warning device.

I claim:

1. In the combination of a bracket and a warning device for use on a vehicle, the warning device having an upper telescoping signal carrying portion and a lower collapsed tripod portion, the bracket having means adapted for interconnection with a portion of the vehicle, said bracket also having a lower retaining portion and an upper clamping portion, the collapsed tripod portion being engaged with said lower portion, and the section of the telescoping portion immediately above said collapsed tripod portion being engaged by said clamping portion.

2. In the combination of a bracket and a warning device for use on a vehicle, the warning device having an upper telescoping signal carrying portion and a lower collapsed tripod portion, the bracket having means adapted for interconnection with a portion of the vehicle, said bracket having a lower supporting portion, a lower retaining portion and an upper clamping portion, the collapsed tripod portion being engaged with said supporting portion and said retaining portion and the section of the telescoping portion immediately above said collapsed tripod portion being engaged by said clamping portion.

3. A combination as in claim 2 wherein the lower supporting portion, the lower retaining portion and the upper clamping portion are formed to permit ready removal of the warning device.

References Cited in the file of this patent

UNITED STATES PATENTS

| | | |
|---|---|---|
| 1,863,442 | Goodman | June 14, 1932 |
| 2,029,707 | Dodelin | Feb. 4, 1936 |
| 2,195,988 | Hoeruegel | Apr. 2, 1940 |
| 2,324,614 | Dalton | July 20, 1943 |
| 2,748,745 | Pobanz | June 5, 1956 |
| 2,781,017 | Fuller | Feb. 12, 1957 |
| 2,856,891 | Solomon | Oct. 21, 1958 |

FOREIGN PATENTS

| | | |
|---|---|---|
| 326,090 | Switzerland | Jan. 31, 1958 |